United States Patent [19]
Bonebright et al.

[11] Patent Number: 5,828,476
[45] Date of Patent: Oct. 27, 1998

[54] DUAL RATE, BURST MODE, RADIATION HARDENED, OPTICAL TRANSCEIVER

[75] Inventors: Rodney K. Bonebright, Milton; Rodney A. Hughes, Tacoma; Jay W. Clement, Kent; John H. Nitardy, Seattle, all of Wash.

[73] Assignee: The Boeing Company, Seattle, Wash.

[21] Appl. No.: 660,972

[22] Filed: Jun. 11, 1996

[51] Int. Cl.⁶ .................................................... H04B 10/00
[52] U.S. Cl. ........................................... 359/152; 359/189
[58] Field of Search ..................................... 359/152, 189, 359/190, 191, 192, 194, 195, 181; 375/319; 250/214 A

[56] References Cited

U.S. PATENT DOCUMENTS

| | | | |
|---|---|---|---|
| 4,713,841 | 12/1987 | Porter et al. | 359/154 |
| 5,371,763 | 12/1994 | Ota et al. | 375/319 |
| 5,430,766 | 7/1995 | Ota et al. | 375/318 |
| 5,444,561 | 8/1995 | Kaminishi | 359/189 |
| 5,644,418 | 7/1997 | Woodward | 359/189 |

*Primary Examiner*—Rafael Bacares
*Attorney, Agent, or Firm*—Christensen, O'Connor, Johnson & Kindness PLLC

[57] ABSTRACT

A transceiver (14) for recovering two different types of manchester coded, optical data signals from a photodiode is disclosed. The transceiver (14) includes a preamplifier (28) that receives and differentially amplifies the optical signal to reject power supply noise. The output of the preamplifier (28) is applied to an AC coupler (30) that extracts DC signal components using a switching circuit to produce a purely differential signal. A post amplifier/quantizer (34) receives the purely differential signal from the AC coupler (30) and generates a quantized signal therefrom. The quantized signal is applied to a data filter, clock recovery and control logic system 36 (36) that recovers a clock signal from the data signal that is synchronized by every data edge of the quantized signal.

28 Claims, 8 Drawing Sheets

DUAL RATE, BURST MODE, RADIATION HARDENED, OPTICAL TRANSCEIVER

FIELD OF THE INVENTION

The invention relates to transceivers and, more particularly, to optical bus communication system transceivers.

BACKGROUND OF THE INVENTION

Recently, a new communications protocol has been developed to meet future military and space optical bus communication needs. This standard, MS 1773, provides for burst mode operation at two rates, one (1) and twenty (20) megabit (MBit) Manchester coded data. The protocol has multi drop (up to 32 receivers and transmitters on the same bus), burst mode (1 MBit recovery by the first bit, and 20 MBit recovery by the 16th bit), and transmission over an optical bus (1300 nm) provisions. These provisions require an MS 1773 transceiver having the capability to receive and transmit optical data, and recover a synchronous clock for 20 MBit data.

The multi drop provision requires the transceiver to have a wide dynamic range (>15 dB). The burst mode provision requires a fast clock recovery design. The optical bus necessitates a single ended receiver input. This makes power supply noise rejection a difficult task to accomplish. Because the MS 1773 protocol targets military and space applications, a low power design is necessary. Because transmitter output power is limited, a large gain requirement is placed on the receiver portion of the transceiver. The space applications make it desirable for MS 1773 transceivers to be as small as possible.

The present invention is directed to providing a transceiver having a clock recovery system that meets the foregoing and other requirements of the MS 1773 protocol.

SUMMARY OF THE INVENTION

In accordance with this invention, a transceiver for recovering one (1) MBit and twenty (20) MBit manchester coded, optical data signals from a photodiode is provided. The transceiver includes a large bandwidth, high gain preamplifier that receives and differentially amplifies the optical signal. The differential amplification rejects power supply noise. The output of the preamplifier is applied to an AC coupler that removes DC signal components using a switching circuit to generate a purely differential signal. A post amplifier/quantizer receives the purely differential signal from the AC coupler to amplify and quantize the signal. The quantized signal is applied to a data filter, clock recovery and control logic system to filter out spurious data from the data stream, recover a synchronizing clock from every data edge of the quantized signal, provide timing control for the post amplifier/quantizer, interface the transceiver and a protocol controller, and provide recovery if reception is lost.

In accordance with other aspects of this invention, the preamplifier applies a reverse bias voltage to the photodiode to substantially reduce its transceiver junction capacitance.

In accordance with further aspects of this invention, the preamplifier provides controlled offset to the received signal to extend the dynamic range of the transceiver.

In accordance with yet other aspects of this invention, the preamplifier provides current feedback in an output stage to extend the bandwidth of the transceiver allowing the transceiver to better respond to radiation-induced single event upsets in space applications.

In accordance with yet still further aspects of this invention, the post amplifier/quantizer includes a threshold detector to generate a switching signal used by the filter, clock recovery and control system to control the switching of the AC coupler.

In accordance with yet still other aspects of this invention, the post amplifier/quantizer includes circuitry for low pass filtering of the AC coupler output signal.

In accordance with yet further other aspects of this invention, the data filter, clock recovery and control logic system includes a filter for removing spurious signals and a look-ahead that functions to provide a delayed quantizer output.

In accordance with yet further other aspects of this invention, the look-ahead is controlled by a frequency locked loop circuit. The frequency locked loop circuit controls the amount of delay generated by the look-ahead and associated circuits in the data filter, clock recovery, and control logic.

In accordance with yet further other aspects of this invention, the look-ahead is formed by a series of delay elements each of which includes a double-gated field effect transistor circuit.

In accordance with also further aspects of this invention, the data filter of the data filter, clock recovery and control logic system, is a logic filter that uses calibrated delay elements to take samples of the incoming data stream at regular intervals, e.g., 1.5 ns, and analyze the samples to determine if the incoming signal is a valid data signal.

In accordance with yet still further other aspects of this invention, the data filter, clock recovery and control logic system includes further data filtering in the form of a data validation check data validation check shift register. The data validation check shift register requires specific incoming data patterns, e.g., 101010 for 20 MBit data and 111111 for 1 MBit data, before the capacitors of the AC coupler are allowed to switch and data reception to begin.

As will be readily appreciated from the foregoing summary, the invention provides a dual rate, burst mode radiation hardened transceiver for recovering two different, e.g., 1 MBit and 20 MBit, manchester coded optical data signals that meets the provisions of the MS 1773 protocol. The large bandwidth of the preamplifier combined with other aspects of this invention provides a substantial measure of radiation hardness. The high gain of the preamplifier combined with its wide dynamic range provide wide link margin in a multi-drop optical system. The single ended to differential conversion by the preamplifier provides power supply noise rejection. The preamplifier output offset increases the dynamic range of the transceiver. The switched capacitor preamplifier to post amplifier AC coupler provides the fast AC coupling required by the large gain of the transceiver. The fast clock recovery aspect prevents single event spurious noise from corrupting the data stream.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
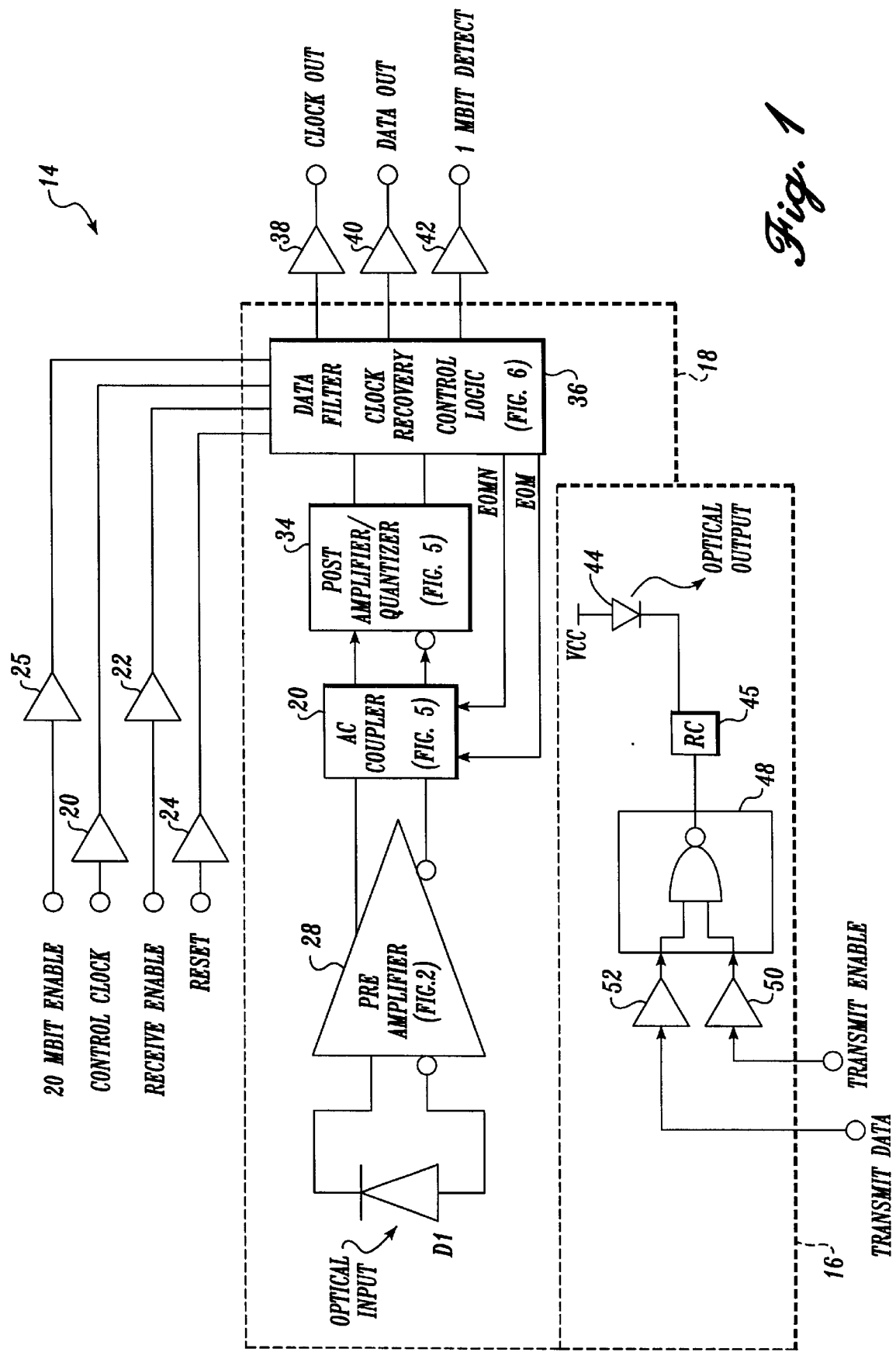
FIG. 1 is a block diagram of a dual rate, burst mode, radiation hardened transceiver formed in accordance with the present invention.

FIG. 1 illustrates a dual rate, burst mode, radiation hardened, optical transceiver 14 formed in accordance with this invention suitable for meeting the MS 1773 protocol. The transceiver 14 transmits and receives optical data via an optical data bus, and provides burst mode operation for manchester coded data at two rates, such as one (1) MBit and twenty (20) MBit. As will be described in more detail below, the transceiver 14 recovers a synchronous clock and, in accordance with this invention, many elements of the transceiver 14 are, preferably, implemented in CMOS.

The transceiver 14 includes a transmitter 16 and a receiver 18. The transmitter 16 is of conventional design and includes a logic element 48, an RC (resistor-capacitor) element 45, an LED 44, and input buffers 50, 52. The logic element 48 is preferably implemented in CMOS. The logic element 48 receives a transmit data signal via one of the input buffers 52. The logic element 48 also receives a transmit enable signal via the other input buffer 50. The state of the transmit enable signal either allows or prohibits the transmission of data. When enabled, the logic element 48 sends the data to be transmitted to the LED 44, which converts the electrical data into optical data suitable for application to the optical data bus. The RC element 45, which is connected between the logic element 48 and the LED 44, controls the rise and fall times and amplitude of the LED current.

The receiver 18 includes: a photodiode designated D1; a preamplifier 28; an AC coupler 30; a post amplifier/quantizer 34; a plurality of input buffers 20, 22, 24; a data filter, clock recovery and control logic system 36; and a plurality of output buffers 38, 40, 42. As will be described in more detail below, D1 detects incoming optical data. The preamplifier 28 receives photo current produced by D1 and transforms this current to create an amplified differential voltage (AC) output signal having a DC differential offset. The output signal is applied to the AC coupler 30, which removes the DC information from the output signal, creating a purely differential AC signal. The purely differential signal is quantized by the post amplifier/quantizer 34 and presented to the data filter, clock recovery and control logic system 36.

The data filter, clock recovery and control logic system 36 also receives a control clock signal, a reset signal, a receive enable signal, and a 20 MBit enable signal via the input buffers 20, 22, 24, 25. As will be described in more detail below, the control clock signal, which is a 40 MHz signal in one actual embodiment of the invention sets the operating point of a frequency locked loop circuit that, in turn, controls delay elements included in a variety of circuits included in the data filter, clock recovery and control logic system 36. The reset signal, as its name implies, resets the data filter, clock recovery and control logic system 36. For ease of illustration, the reset connections are not shown in the filter clock recovery and control logic system 36 shown in FIG. 6 and described below. The receive enable signal enables the data filter, clock recovery and control logic system 36 to receive incoming data. The 20 MBit enable signal enables the data filter, clock recovery and control logic system 36 to receive 20 MBit data. When the data filter, clock recovery and control logic system 36 is not enabled for 20 MBit data reception, the filter, clock recovery control logic system 36 is set to receive the other type of incoming data, i.e., 1 MBit data. The buffers 20, 22, 24 for these signals that interface the signal sources and the data filter, clock recovery and control logic system 36 protect the components of the data filter, clock recovery and control logic system 36 from receiving a destructive electrostatic discharge.

The data filter, clock recovery and control logic system 36 monitors incoming data and determines when to trigger the AC coupler 30, to create the purely differential signal. The decision is based on a threshold signal produced by the post amplifier/quantizer 34, and other internally searched signals that are described below. The data filter, clock recovery and control logic system 36 generates a CLOCK OUT and DATA OUT signals that are applied through two of the output buffers 38, 40 to an external protocol controller (not shown) for decoding and subsequent processing. The data filter, clock recovery and control logic system 36 also generates a 1 MBit detect signal that is applied through the remaining output buffer 42 to the protocol controller. The state of the 1 MBit detect signal causes the protocol controller to be set to decode either 1 MBit data or 20 MBit data.

Figure 2:
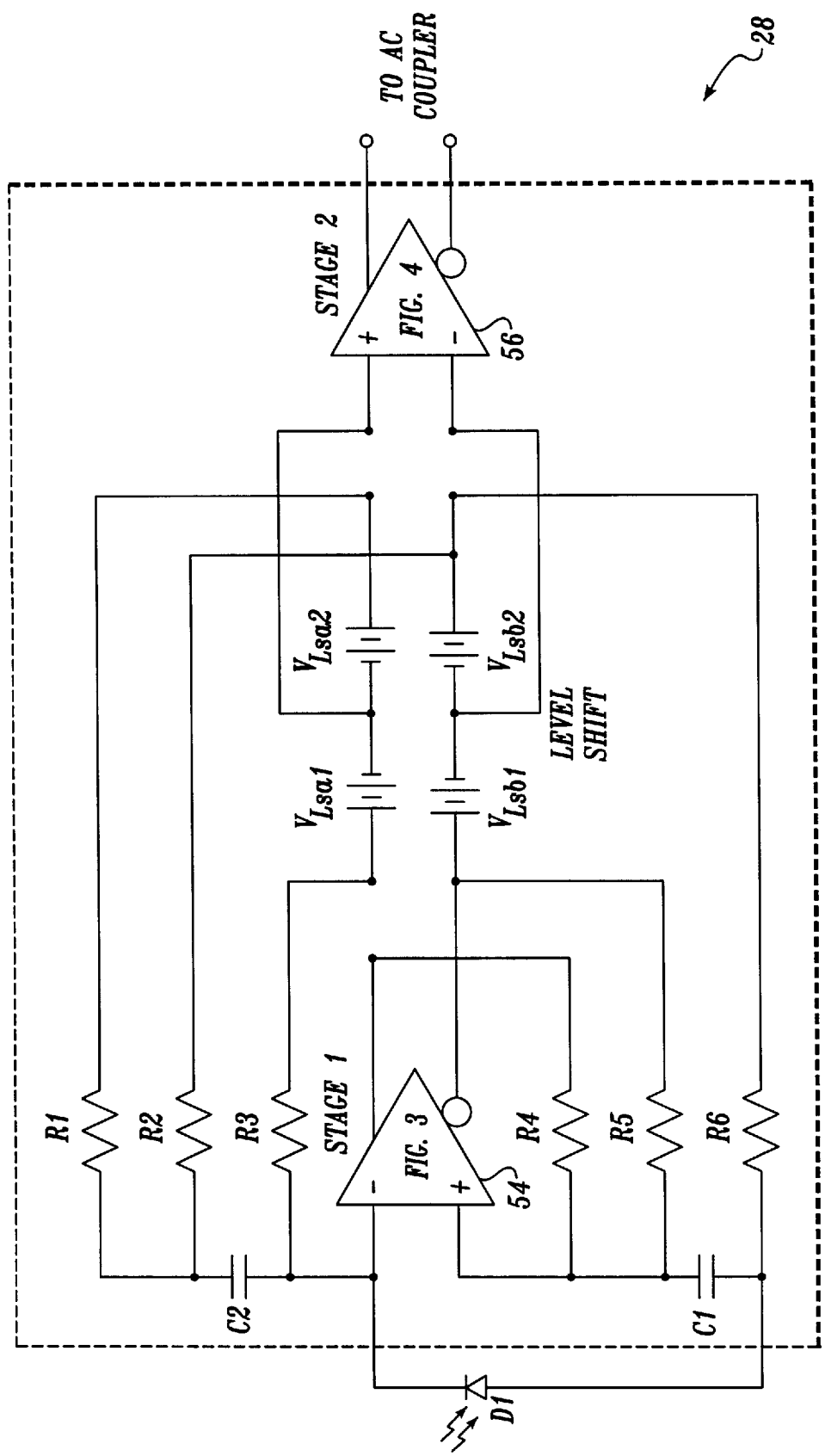
FIG. 2 is a schematic diagram of a preamplifier suitable for use in the transceiver illustrated in FIG. 1.

Turning now to a more detailed description of the receiver 18, when an optical input is incident on D1, a small photocurrent is produced. The photocurrent is amplified by the preamplifier 28. As illustrated in FIG. 2, the preferred preamplifier 28 comprises: six resistors designated R1, R2, R3, R4, R5 and R6; two capacitors designated C1 and C2; a voltage level shift diagrammatically illustrated as four batteries designated $V_{1sa1}$, $V_{1sa2}$, $V_{1sb1}$ and $V_{2sb2}$; a differential voltage amplifier 54; and a differential voltage buffer 56. D1 is also shown in FIG. 2. The anode of D1 is connected to the negative input of the differential voltage amplifier 54. R3 is connected between the negative input of the differential voltage amplifier 54 and the noninverted output of the differential voltage amplifier 54. One end of R1 and one end of R2 are connected through C2 to the negative input of the differential voltage amplifier 54. The noninverted output of the differential voltage amplifier 54 is connected through $V_{1sa1}$ and $V_{1sa2}$ to the other end of R1. More specifically, $V_{1sa1}$ and $V_{1sa2}$ are connected in series with the positive side of $V_{1sa1}$ connected to the negative side of $V_{1sa2}$. The positive side of $V_{1sa1}$ is connected to the noninverted output of the differential voltage amplifier 54. The negative side of $V_{1sa2}$ is connected to the other end of R1. The junction between $V_{1sa1}$ and $V_{1sa2}$ is connected to the positive input of the differential voltage buffer 56.

The anode of D1 is connected through C1 to the positive input of the differential voltage amplifier 54. The positive input of the differential voltage amplifier 54 is also connected to: the noninverted output of the differential voltage amplifier 54 through R4; and the inverted output of the differential voltage amplifier 54 through R5. The anode of D1 is also connected to the negative side of $V_{2sb2}$ through R6. The negative side of $V_{2sb2}$ is also connected to the other end of R2. The inverted output of the differential voltage amplifier 54 is connected through $V_{1sb1}$ to $V_{2sb2}$. More specifically, $V_{1sb1}$ and $V_{2sb2}$ are connected in series with the positive end of $V_{1sb1}$ connected to the negative end of $V_{2sb2}$. The positive side of $V_{1sb1}$ is connected to the inverted output of the high gain differential amplifier 54. The junction between $V_{1sb1}$ and $V_{2sb2}$ is connected to the negative input of the differential voltage buffer 56.

Figure 3:
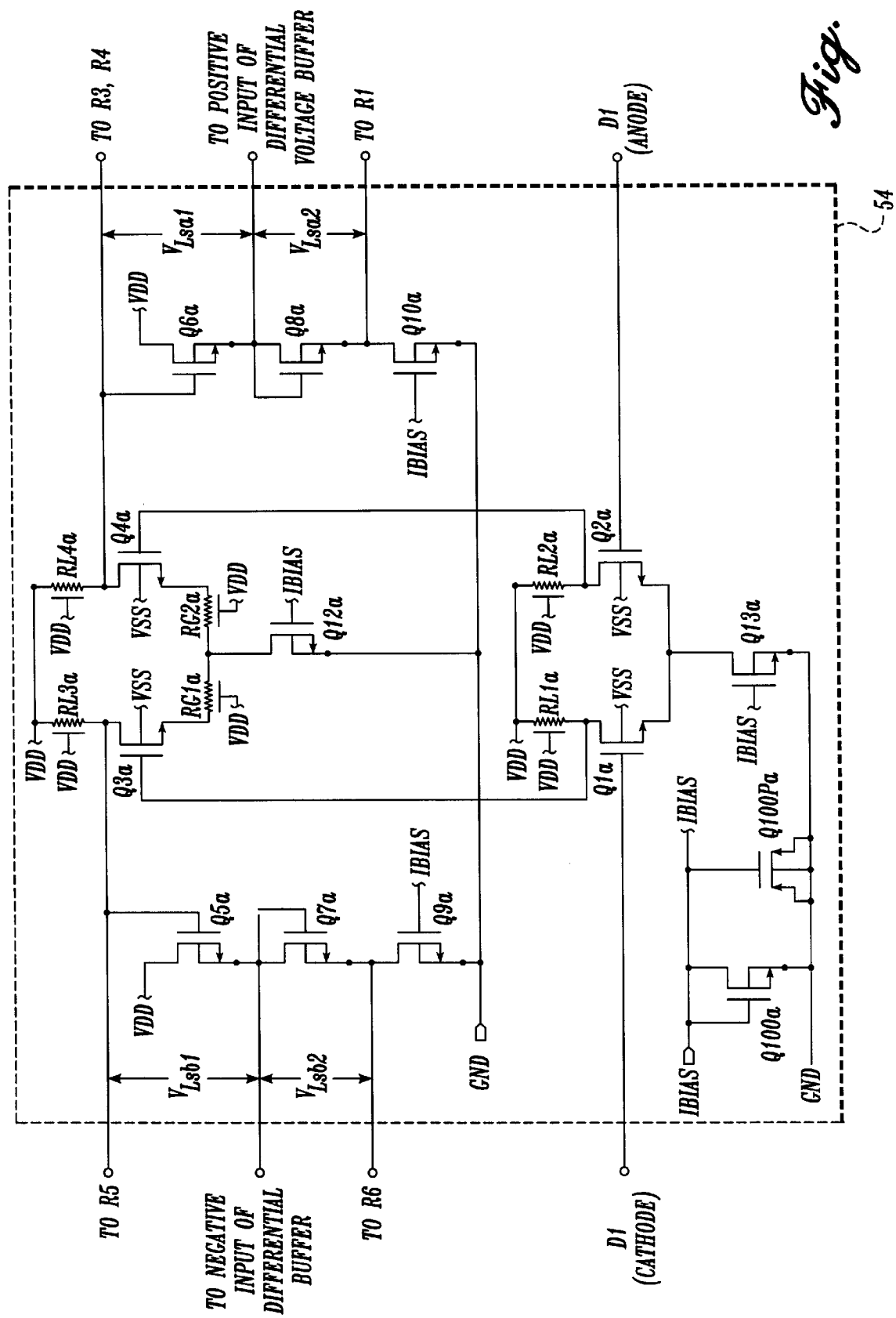
FIG. 3 is a schematic diagram of a differential voltage amplifier suitable for use in the preamplifier illustrated in FIG. 2.

As shown in FIG. 3, the preferred embodiment of the differential voltage amplifier 54 comprises fourteen N-channel depletion MOSFETs designated Q1a, Q2a, Q3a, Q4a, Q5a, Q6a, Q7a, Q8a, Q9a, Q10a, Q12a, Q13a, Q100a, and Q100Pa and six resistors designated RL1a, RL2a, RL3a, RL4a, RG1a and RG2a. Also illustrated in FIG. 3 is a voltage reference for constant current sources designated IBIAS. The supply voltage is designated VDD, VSS and GND designate signal ground.

All of the MOSFETs of one actual embodiment of the differential voltage amplifier illustrated in FIG. 3 have a length, L, of 1.2 micrometers (microns) except Q100Pa. Q1a and Q2a each have a width, W, of 600 micrometers. Q3a and Q4a each have a width, W of 400 micrometers. Q5a, Q6a, Q7a, and Q8a each have a width, W, of 100 micrometers. Q9a and Q10a each have a width, W, of 150 micrometers. Q13a has a width, W, of 2000 micrometers. Q100a has a width, W, of 20 micrometers. Q100Pa has a width, W, of 294 micrometers and a length, L, of 294 micrometers. RL1a, RL2a, RL3a, RL4a, RG1a, and RG2a each have a width, W, of 3 micrometers. RL1a and RL2a have a resistant value of 300 ohms. RL3a and RL4a each have a resistance value of 666 ohms. RG1a and RG2a each have a resistance value of 40 ohms. As will be appreciated by those skilled in this art and others, the above-mentioned dimensional values for the transistors and the resistors are preferred values that may vary depending on the process used to create a CMOS preamplifier 28.

IBIAS is applied to the gate and drain of Q100a as well as the gate of Q100Pa. The source and substrate of Q100a are connected together to ground. The substrate, source, and drain of Q100Pa are connected to ground. Q100a and Q100Pa form a voltage reference IBIAS for constant current sources formed by the MOSFETs with gates connected to IBIAS.

The substrate and source of Q13a are connected to ground. Regulated IBIAS is applied to the gate of Q13a and the drain of Q13a is connected to the source of Q1a and Q2a. The gates of Q1a and Q2a serve as the negative input and the positive input respectively of the differential voltage amplifier 54. Thus, the gate of Q1a is connected to the cathode of D1a, and the gate of Q2a is connected to the anode of D1. The substrates of Q1a and Q2a are connected to VSS. As stated above, VSS is in turn connected to signal ground. The drains of Q1a and Q2a are connected through RL1a and RL2a respectively to VDD.

The drains of Q1a and Q2a are also connected to the gates of Q3a and Q4a respectively. The sources of Q3a and Q4a are connected through RG1a and RG2a, respectively, to the drain of Q12a. Regulated IBIAS is applied to the gate of Q12a and the substrate and source of Q12a are connected together to ground. The substrates of Q3a and Q4a are connected to VSS. The drains of Q3a and Q4a are connected together through RL3a and RL4a, respectively, to VDD.

The drains of Q3a and Q4a are connected to the gates of Q5a and Q6a, respectively. The drains of Q5a and Q6a are connected to VDD. The substrates and sources of Q5a and Q6a are each connected together and to the gates and drains of Q7a and Q8a, respectively. The substrates and sources of Q7a and Q8a are each connected together and to the drains of Q9a and Q10a, respectively. The substrates and sources of Q9a and Q10a are connected together and to ground. Regulated IBIAS is applied to the gates of Q9a and Q10a.

As will be readily appreciated by those skilled in the art and others from the foregoing description and viewing FIG. 3, the illustrated differential voltage amplifier 54 is a dual stage differential amplifier embodied in CMOS. Q100a and Q100Pa create a regulated bias voltage IBIAS that is used to provide constant current produced by Q9a, Q10a, Q12a and Q13a. The first stage of the differential amplifier is formed by Q1a and Q2a. The second stage is formed by Q3a and Q4a. The Q5a/Q7a and Q6a/Q8a combinations form voltage shift functions that create the $V_{1sa1}$, $V_{1sa2}$, $V_{1sb1}$, and $V_{2sb2}$ voltages diagrammatically shown as batteries in FIG. 2.

Figure 4:
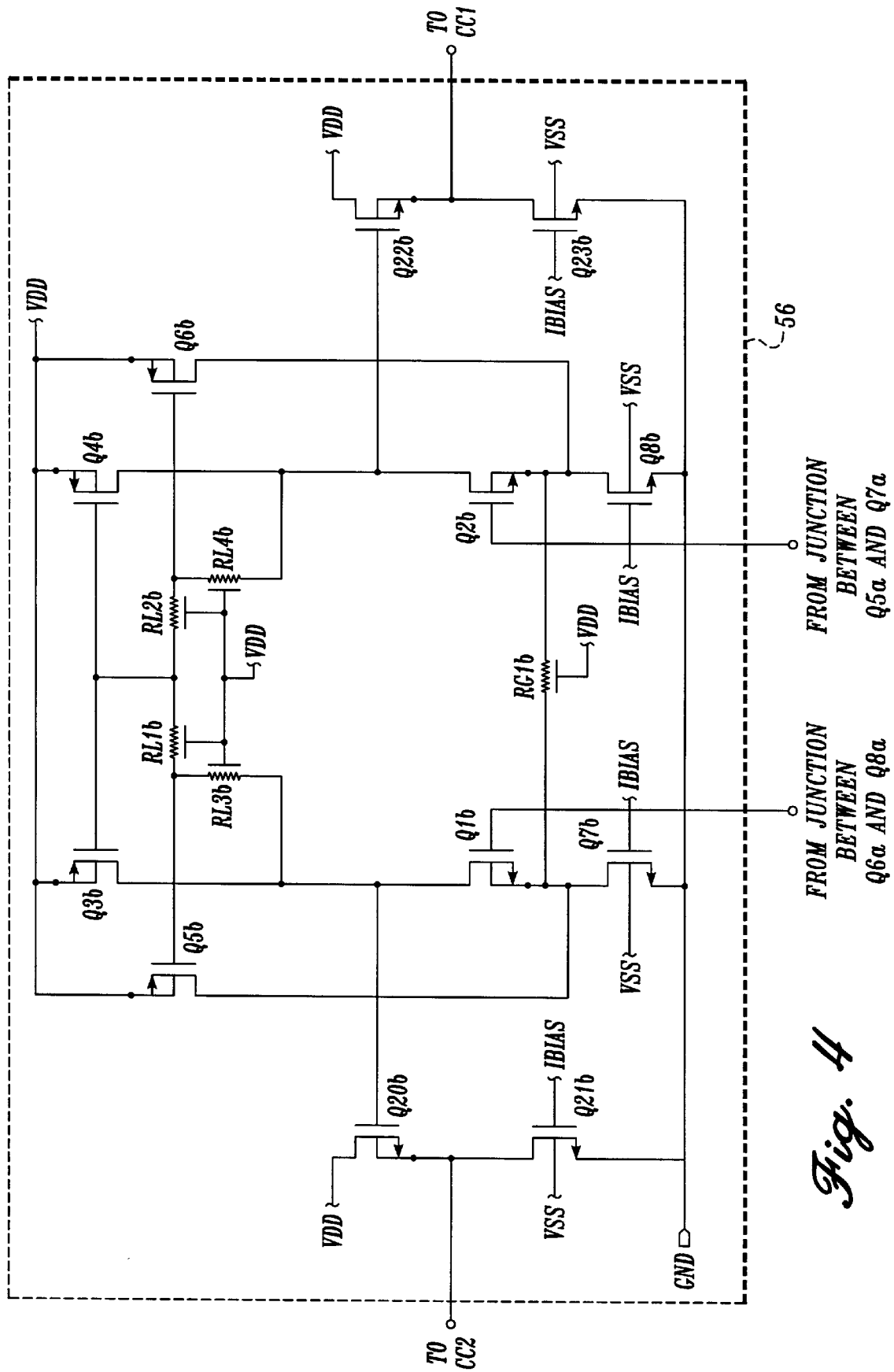
FIG. 4 is a schematic diagram of a differential voltage buffer suitable for use in the preamplifier illustrated in FIG. 2.

The differential voltage buffer 56 is illustrated in FIG. 4. The differential voltage buffer 56 comprises twelve MOSFETs designated Q1b, Q2b, Q3b, Q4b, Q5b, Q6b, Q7b, Q8b, Q20b, Q21b, Q22b,sddd and Q23b and five resistors designated RG1b, RL1b, RL2b, RL3b and RL4b. Q3b, Q4b, Q5b, and Q6b are P-channel MOSFETs. The remaining MOSFETs are N-channel MOSFETs. In one actual embodiment of the differential voltage buffer 56 illustration in FIG. 4, Q1b Q2b, Q3b, Q4b, Q5b, Q6b, Q20b, and Q22b each have a length, L, of 1.2 micrometers. Q21b, Q7b, Q8b, and Q23b each have a length, L, of two micrometers. Q3bhas a width, W, of 300 micrometers and Q4b has a width, W, of 200 micrometers. Q5b and Q6b each have a width, W, of 50 micrometers. Q20b and Q22b each have a width, W, of 1,000 micrometers. Q1b and Q2b each have a width, W, of 1,200 micrometers. Q21b and Q23b each have a width, W, of 600 micrometers. Q7b and Q8b each have a width, W, of 600 micrometers. RL1b, RL2b, RL3b, and RL4b each have a resistance value of 666 ohms and a width, W, of 3 micrometers. The stray capacitance associated with each resistor is relative to the substrate, which is connected to VDD. As will be readily appreciated by those skilled in this art and others, the above-mentioned dimensions for the transistors and the resistors are preferred values which may vary from amplifier to amplifier.

The gates of Q1b and Q2bserve as the positive and negative inputs respectively of the differential voltage buffer 56. More specifically, the gate of Q1b is connected to the junction between Q6a and Q8a, which is the junction between $V_{1sa1}$ and $V_{1sa2}$ (FIG. 2). The gate of Q2bis connected to the junction between Q5a and Q7a which is the junction between $V_{1sb1}$ and $v_{1sb2}$. The substrates and sources of Q1b and Q2b are connected together and to one another through RG1b.

The sources of Q1b and Q2b are connected to the drains of Q7b and Q8brespectively. Regulated IBIAS is applied to the gates of Q7b and Q8b. The substrates of Q7b and Q8b are connected to VSS, which is, in turn, connected to signal ground. The sources of Q7b and Q8b are connected to ground.

The drains of Q1b and Q2b are also connected to the gates of Q20b and Q22b, respectively. The drains of Q20b and Q22b are connected to VDD. The substrates and sources of Q20b and Q22b are each connected together to the drains of Q21b and Q23b, respectively. The substrates of Q21b and Q23b are connected to VSS. Regulated IBIAS is applied to the gates of Q21b and Q23b. The sources of Q21b and Q23b are connected to ground.

The junction between Q1b and Q7b is connected to the drain of Q5b and the junction between Q2b and Q8b is connected to the drain of Q6b. The substrates and sources of Q5b, Q6b, Q3b, and Q4b are connected together and the common connections are connected to VDD. The gates of Q5b and Q6b are connected together through RL1b and RL2b. The gates of Q3b and Q4b are connected together and to the junction between RL1b and RL2b. The drain of Q3b is connected through RL3b to the gate of Q5b and the drain of Q4b is connected through RL4b to the gate of Q6b.

Because of its interrelationship with the overall operation of the preamplifier 28, a brief description of the differential voltage buffer 56 is not set forth here. Rather, the description is included with the following description of the operation of the preamplifier 28.

Returning to FIG. 2, the preamplifier 28 functions as a transimpedance amplifier by converting the photo current generated by D1 in response to incoming light to voltage difference at the output of the differential voltage buffer 56. The differential voltage amplifier 54, plus the level shift provided by $V_{1sa1}$, $V_{1sa2}$, $V_{1sb1}$ and $V_{1sb1}$, form stage one of the preamplifier 28. The differential voltage buffer 56 forms the second stage two of the preamplifier 28. With respect to stage one, C1, C2, R1, R2, R3, R4, R5, and R6 constitute a passive impedance network. In order to minimize stray capacitance, this impedance network is located apart from the semiconductor die containing the differential voltage amplifier 54 and the differential voltage buffer 56. R1, R2, and C2 provide a balancing impedance to the amplifier inputs to cancel common mode external noise resulting from power supply coupling or modulation of bias points. For example, IBIAS may have a voltage disturbance associated with it. This voltage disturbance will cause common mode bias point variations. Because both stages of the preamplifier 28 amplify only differential voltages, the common mode voltage variations resulting from IBIAS disturbances are rejected, thereby reducing the occurrence of bit errors in the transceiver 14.

R1, R2, R3, R4, R5, and R6 all contribute to the common mode feedback around the differential voltage amplifier 54. R3 and R6 provide differential feedback around the differential voltage amplifier 54. Preferably, the resistance of R1, R2, R4, and R5 is twice the resistance value of R3 and R6. In one actual embodiment of the invention, R1, R2, R4, and R5 each have a resistance value of 50,000 ohms and R3 and R6 each have a resistance value of 25,000 ohms. C1 and C2 are selected to have capacitance values large enough to block DC signal components while at the same time pass AC signal components. In one actual embodiment of the invention, C1 and C2 each have a capacitance value of 600 picofarads.

Turning now to the operation of the preamplifier 28, when there is no light input to D1, R3, R4, and R5 cause the inputs to the differential voltage amplifier 54 to be driven to the average common mode DC voltage of the differential outputs of the amplifier. When a light input is applied to D1, the resulting photocurrent flows through R1, R2, R3, R4, R5 and R6. The photocurrent in this transimpedance network causes a voltage to be developed across the inputs of the differential voltage amplifier 54. In response, the differential voltage amplifier 54 develops a voltage difference that, via R3, R4 and R5, drives the voltage across the inputs of the differential voltage amplifier 54 back to zero. The average common mode voltage at the outputs of the differential voltage amplifier 54 remains constant. Power supply rejection is accomplished because the entire feedback network is voltage referenced to the output common mode voltage. Thus, only the current through D1 is amplified.

$V_{1sa1}$, $V_{1sa2}$ $V_{1sb1}$, and $V_{2sb2}$ provide a DC voltage level shift of the output of the differential voltage amplifier 54. In this regard, as will be readily appreciated by those skilled in this art and others, D1 will typically have an associated junction capacitance. The level shift reverses bias D1 with a DC voltage. The reverse bias modulates the junction capacitance to a smaller, more desirable value. In one actual embodiment of the invention, the values of $V_{1sa1}$, $V_{1sa2}$, $V_{1sb1}$, and $V_{1sb2}$ were each approximately 1.2 volts. The D1 reverse bias caused by this level shift was approximately 2.4 volts DC. The transimpedance of stage one of this embodiment of the invention was 50,000 ohms.

The differential voltage buffer 56 increases voltage and current gain to a level adequate for the signals of the preamplifier 28 to drive the post amplifier/quantizer 34 in the manner described below. Q1b and Q2b of the differential voltage buffer 56 form a differential transconductance stage with the degenerated gain determined by RG1b. The resistive load formed by RL1b, RL2b, RL3b and RL4b is split at its center to provide a common mode voltage feedback signal to the gates of Q3b and Q4b. The output currents of Q3b and Q4b are controlled by the width ratio of Q3b to Q4b. In one actual embodiment of the invention, the width ratio of Q3b to Q4b is 3:2. When there is no light input to D1, zero voltage is present at the inputs of the differential voltage buffer 56. The current imbalance caused by the width ratio of Q3b and Q4b causes a DC voltage to be developed across the output load resistors. This forced imbalance results in an inherent voltage offset, which extends the allowable signal dynamic range. The Q20b, Q21b and Q22b, Q23b pairs are source followers that add power gain. In one actual embodiment of the invention, the dynamic range of the transceiver 14 was in the approximate range of −16 dBm to −36 dBm.

Q5b and Q6b provide some current feedback in an output stage which extends the usable bandwidth. This allows the transceiver 14 to operate at higher frequencies, which makes the transceiver 14 more immune to single event upsets (SEUs) which, in space and other applications, typically involve ions impinging on the photodiode D1 creating spurious signals that are sometimes quite large. In one actual embodiment of the invention, the bandwidth of the transceiver 14 was approximately 60 MHz. The data information bandwidth was measured to be 30 MHz.

If desired, the configuration of the differential voltage buffer 56 could be changed to eliminate the DC offset. This is accomplished by setting the width ratio of Q3b and Q4b to 1:1. The advantage of this configuration is that the voltage gain of the differential voltage buffer 56 is set by resistance values that do not contribute to the output common mode DC voltage gain. In one actual embodiment of the invention, the voltage gain of the differential voltage buffer 56 was approximately 18 dB.

As shown in FIG. 1 and described above, the differential output signal of the preamplifier 28 is applied to the AC coupler 30. The AC coupler 30 and the post amplifier/quantizer 34 remove the DC signal from the differential output and adjust the signal for quantization.

Figure 5:
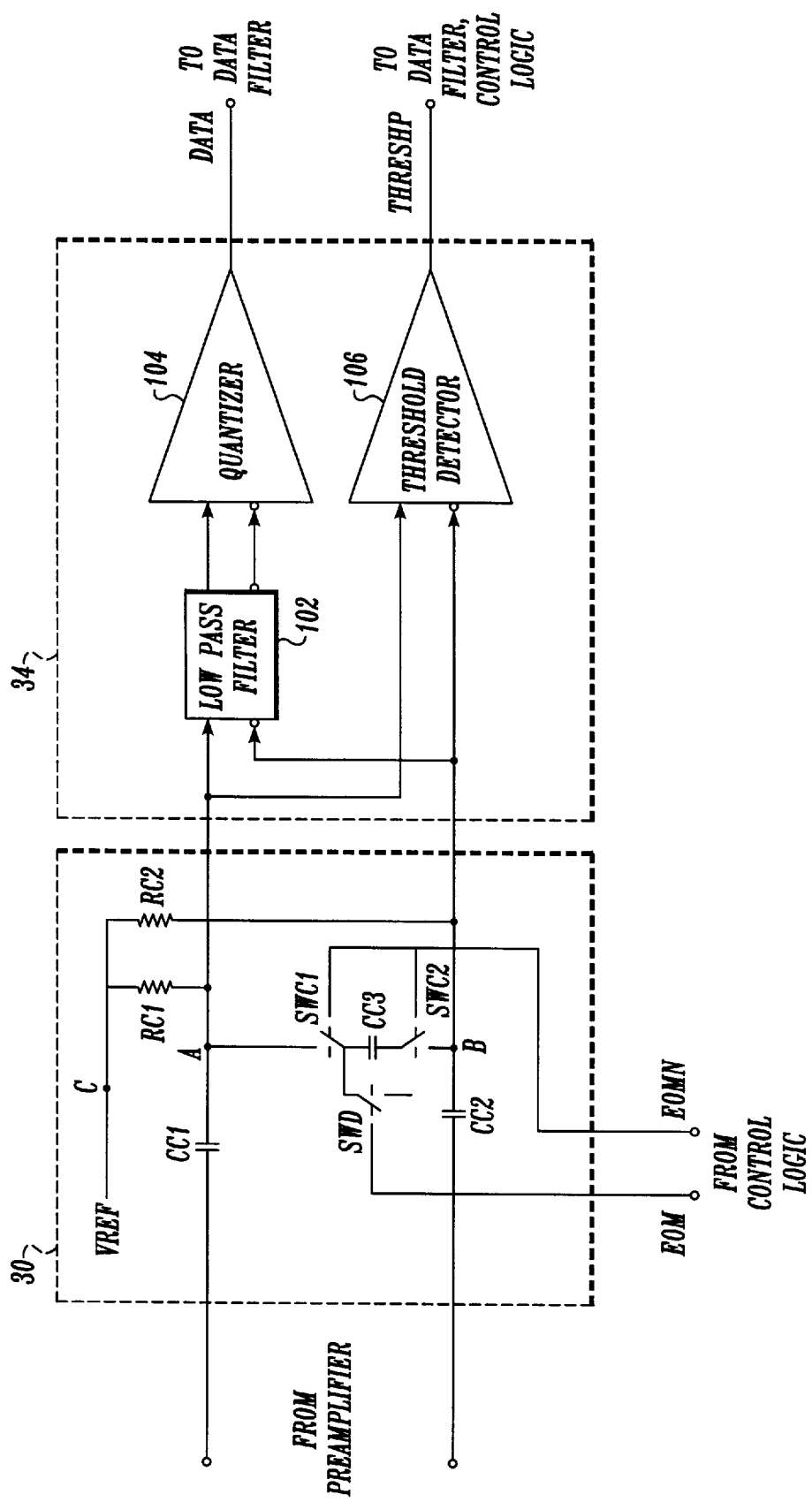
FIG. 5 is a schematic diagram of an AC coupler and a post amplifier suitable for use in the transceiver illustrated in FIG. 1.

As shown in FIG. 5, the AC coupler 30 includes: two resistors designated RC1 and RC2; three capacitors designated CC1, CC2, and CC3; and three switches SWC1, SWC2, and SWD. The inputs of the AC coupler 30, i.e., the outputs of the preamplifier 28, are connected to CC1 and CC2, one to one end of CC1 and the other to one end of CC2. The other end of CC2 is connected to a node designated A. The other end of CC2 is connected to a node designated B. CC1 is connected to a reference voltage, VREF, at a node designated C. Node C is connected to node A through RC1. Node C is connected to node B through RC2. CC3 is connected to node B through SWC2. CC3 is also connected to node A through SWC1. SWD is connected across CC3. In one actual embodiment of the invention, RC1 and RC2 each have a value of 1 mega ohm, CC1 and CC2 each have a value of 10 picofarads, and CC3 has a value of 5 picofarads. VREF is approximately 3.5 volts.

In the absence of incoming data, SWC1 and SWC2 are closed, connecting CC3 to node A and node B. This causes a differential signal applied to the AC coupler to be attenuated. SWD is open. The AC coupler 30 remains in this state until data is received and the data filter, clock recovery and control logic system 36 switches SWC1 and SWC2 open, and closes SWCD, as described below.

The post amplifier/quantizer 34 includes a low pass filter 102, a quantizer 104, and a threshold detector 106. The inputs of the threshold detector 106 are connected to node A and node B, as are the inputs of the low pass filter 102. The output of the low pass filter 102 is connected to the input of the quantizer 104.

The threshold detector 106 distinguishes between a valid data signal and noise. More specifically, the threshold detector 106 checks to see if magnitude of the incoming signal is at or above a predetermined amplitude such as 25 millivolts. If the incoming signal exceeds the predetermined amplitude, it is considered a valid data signal. When this occurs, the output of the threshold detector 106 changes state. The state change, via the data filter, clock recovery and control logic system 36, causes SWC1 and SWC2 to open and SWD to close. More specifically, as will be better understood from the following description of the data filter, clock recovery and control logic system 36, a predetermined period of time (e.g., 7 ns) after the threshold detector 106 detects a falling edge of data, the output of the threshold detector 106 changes state. After another predetermined time period (e.g., 30 ns), the data filter, clock recovery and control logic system 36 causes one end of message control signals designated EOMN to switch state. The state of EOMN controls the open/closed state of SWC1 and SWC2. Thereafter, after another predetermined period of time (e.g., 50 ns), another end-of-message control signal designated EOM switches state. The state of EOM controls the open/closed state of SWD. The timing is chosen such that the change in state of the EOMN causes SWC1 and SWC2 to open at a time coinciding with the middle of the logic one state following a detected falling edge. In particular, the timing of the switching of SWC1 and SWC2 is chosen to allow the rising edge following the falling edge to reach one-half amplitude. Switching CC3 off at this time eliminates the attenuation of the incoming signal. All subsequent data edges are passed at full amplitude, providing a purely differential signal for ultimate quantization by the quantizer 104. When no more data is detected by the threshold detector 106, for a predetermined period of time EOMN and EOM revert to their quiescent state, causing the SWC1 and SWC2 to close and SWD to open. During the period SWD was closed, the charge on CC3 was dissipated through the inherent resistance in the leads connecting SWD to CC3.

Before the quantizer 104 processes the purely differential signal, the purely differential signal is filtered by the low pass filter 102. As described above, the bandwidth of the preamplifier 28 is wide (e.g., 60 MHz), approximately twice the information bandwidth (e.g., 30 MHz). The low pass filter 102 eliminates significant noise in the unused part of the bandwidth by setting the cutoff frequency of the low pass filter 102 just above the upper end of the information bandwidth (e.g., at 35 MHz). Eliminating noise in the unused part of the preamplifier 28 bandwidth reduces data bit error. The quantizer 104 receives the filtered, purely differential signal. The quantizer 104 assigns a logic one to a positive differential signal and assigns a logic zero to a negative differential signal.

The outputs of the post amplifier/quantizer 34 are a data signal and a threshold detect signal. These outputs are applied to the data filter, clock recovery and control logic system 36.

Figure 6:
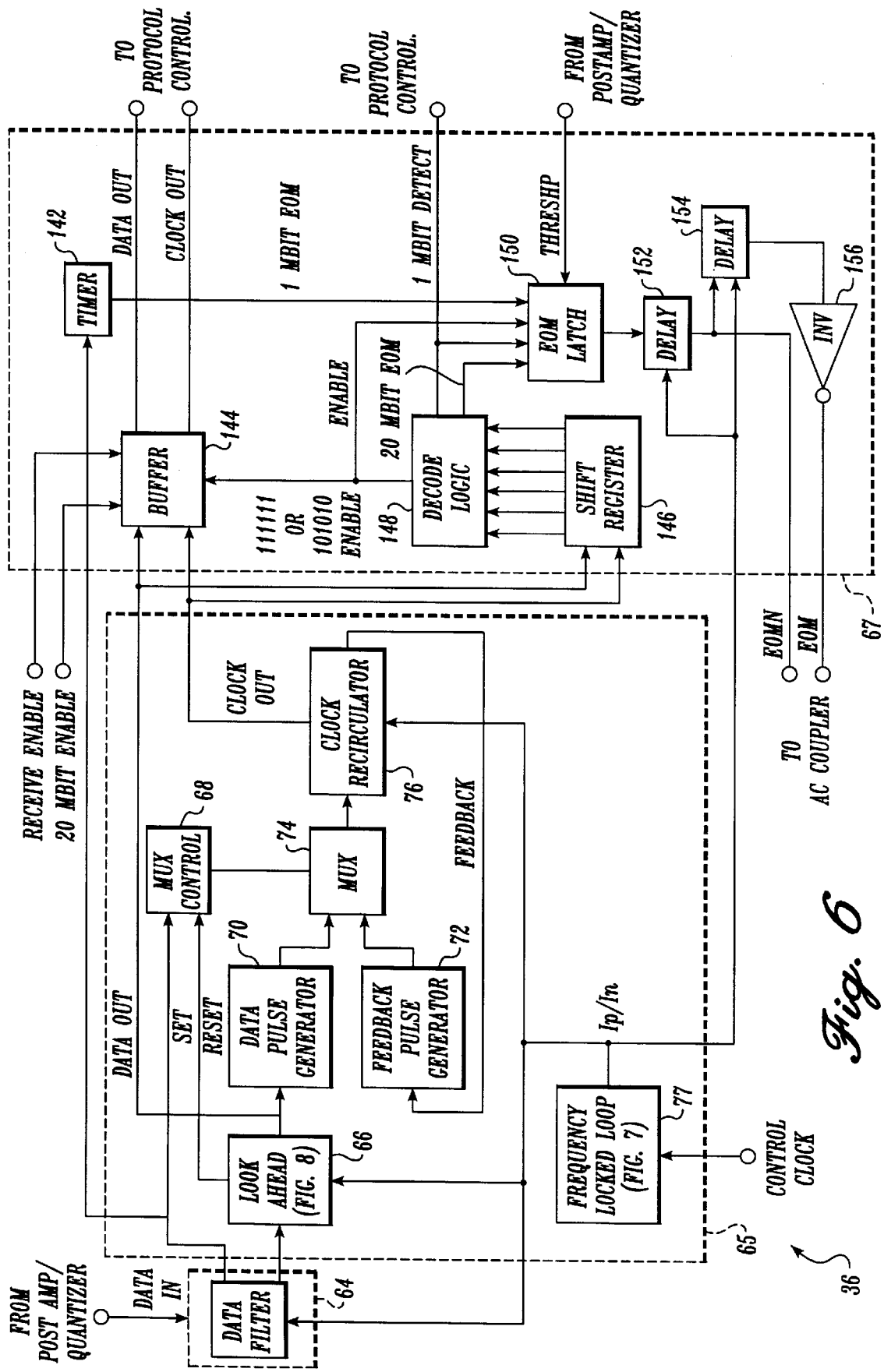
FIG. 6 is a block diagram of a data filter, clock recovery and control logic system suitable for use in the transceiver illustrated in FIG. 1.
Figure 8:
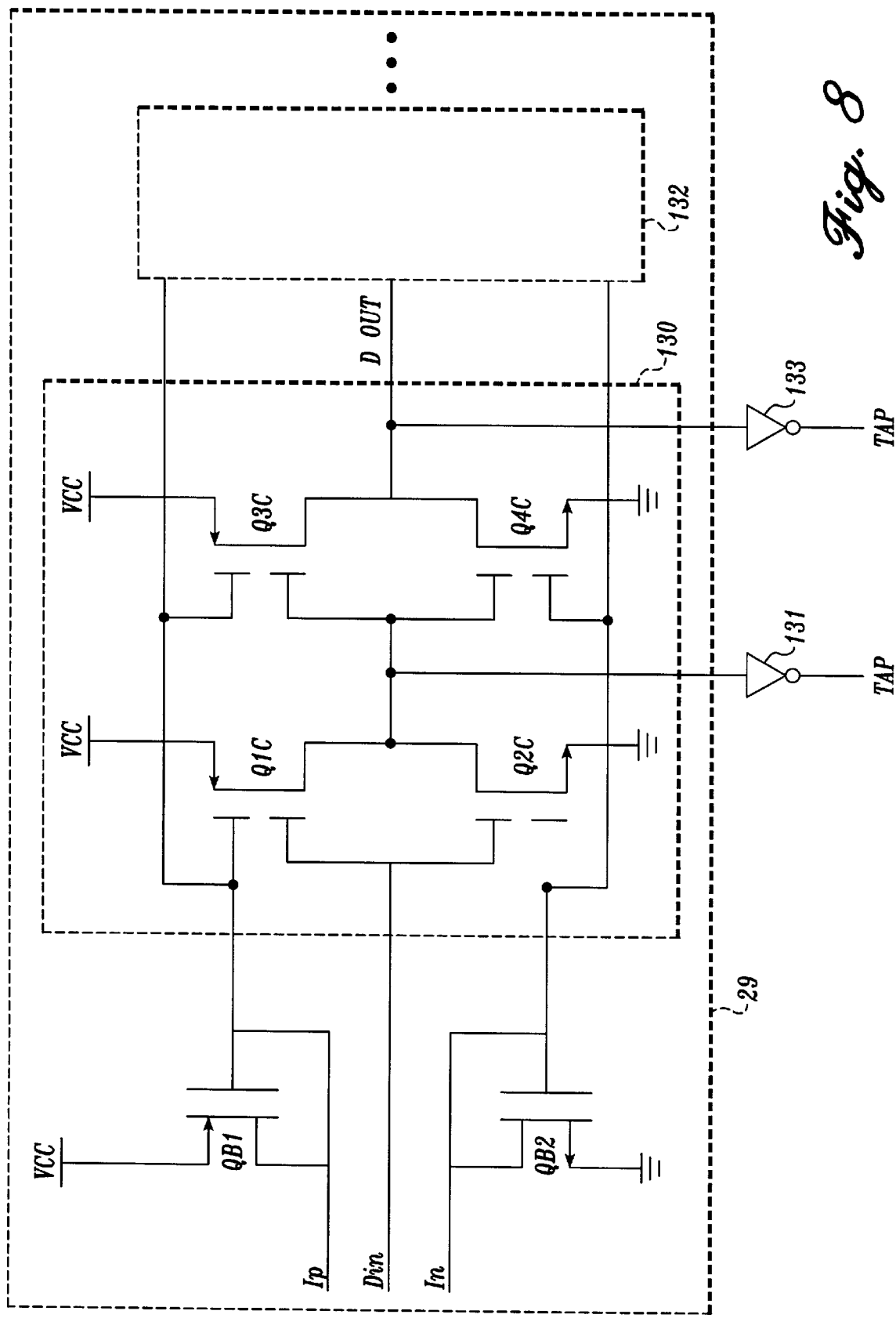
FIG. 8 is a schematic diagram of a network of delay elements suitable for use in various blocks depicted in FIGS. 6 and 7.

FIG. 6 is a simplified functional block diagram of a data filter, clock recovery and control logic system 36 formed in accordance with this invention. The data filter, clock recovery and control logic system 36 includes a data filter 64, a clock recovery subsystem 65 and a control logic subsystem 67. The data filter 64 receives the data output of the quantizer 104. The data filter 64 is a logic filter formed of a series of delay elements that requires incoming data to be stable for a programmed amount of time prior to acceptance. More, specifically, the delay elements are programmed to produce samples of the incoming data stream at periodic intervals, such as every 1.5 ns. If the incoming data is stable for a predetermined period of time, e.g., 20 ns, the data is passed unchanged. This guarantees minimum edge spacing, which allows a clock to be generated that never violates setup or hold timing. Delay elements suitable for use in forming the data elements are shown in FIG. 8 and described below. The delay elements are controlled by a frequency locked loop circuit that forms part of the clock recovery subsystem 65 described below.

In addition to satisfying set up time and hold time requirements, the data filter 64 rejects SEUs that create noise pulses having transient spikes that contain no data information. One example of an SEU is an ion incident on D1 which would cause a logic one state to be present for a short period of time. The data filter 64 checks for the occurrence of SEUs by taking data samples at the predetermined period noted above, i.e., every 1.5 nanoseconds. If, based upon the samples, the data filter 64 observes a logic one state for longer than the stable predetermined period, i.e., 20 nanoseconds, the data is passed. If the data has a logic one state for less than 20 nanoseconds, the data is rejected by the data filter 64. Since an SEU will not last for 20 nanoseconds or more, pulses created by SEUs are rejected. Data which has a logic one state longer than 20 nanoseconds will be retained and passed by the filter. Thus, a logic one data state of at least 25 nanoseconds will pass through the data filter 64.

The data filter 64 also checks for dark state data, i.e., a logic zero state data. If the data is in a logic zero state for a predetermined period of time, e.g., 5 nanoseconds, the data is passed. The data filter 64 passes such data because an SEU-based ion cannot create a logic zero state. When a logic zero exists for the chosen time period, e.g., 5 nanoseconds, the data is accepted. The data filter 64 also checks the separation between two data edges. More specifically, the data filter 64 requires that data edges be a predetermined period, e.g., 15 nanoseconds, apart. As will be better understood from the following discussion of FIGS. 7 and 8, the data filter 64 accomplishes the foregoing. The data filter 64 accomplishes the foregoing by using logic decodes to check the outputs of the relevant stages of the series of delay elements referred to above.

The clock recovery subsystem 65 shown in FIG. 6 includes a look-ahead 66, a multiplexer 74 (Mux) control 68, a data pulse generator 70, a feedback pulse generator 72, a multiplexer 74 (Mux) 74, a clock recirculator 76 and a frequency locked loop circuit 77. The clock recovery subsystem 65 receives manchester coded data from the data filter 64 and recovers a synchronous clock from the data that meets set up time and hold time requirements, and clock pulse width requirements. Meeting these requirements avoids the occurrence of metastability, i.e., avoids coincidence between a recovered clock edge and a data edge, which can result in malfunction of an associated protocol controller. In one actual embodiment of the invention, the set up time was chosen to guarantee that data was stable for 7.5 nanoseconds (ns) before clock recovery was allowed to occur. The hold time requirement guaranteed that, after the creation of a clock edge, the data would remain stable for 5 nanoseconds.

As described in more detail below, the clock recovery subsystem 65 resynchronizes the recovered clock on every new data edge by creating a falling clock edge a predetermined period of time, e.g., 7.5 nanoseconds, after each new data edge. Because clock edges are created 7.5 nanoseconds after a data edge, and because the data filter 64 rejects data having edges less than 15 nanoseconds apart, the above mentioned set up and hold time requirements are never violated.

The output of the data filter 64 is applied to the look-ahead circuit 66 and to the set input of a latch included in the multiplexer control 68. One output of the look-ahead 66 is applied to the input of the data pulse generator 70. A second (later) output is applied to the reset input of the latch of the multiplexer control 68. The output of the data pulse generator is applied to one signal input of the multiplexer 74. The output of the multiplexer control 68 is applied to the control input of the multiplexer 74. The output of the multiplexer 74 is applied to the input of the clock recirculator 76 and the output of the clock recirculator 76 is applied to the input of the feedback pulse generator 72. The output of the feedback pulse generator 72 is applied to the second signal input of the multiplexer 74.

Figure 7:
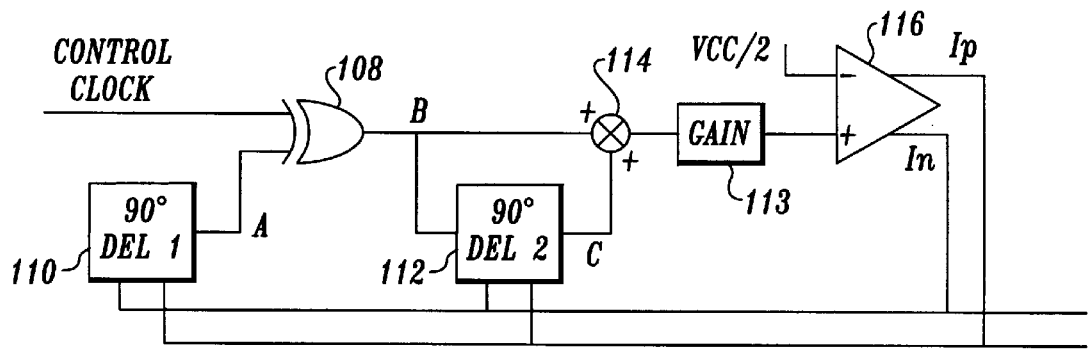
FIG. 7 is a functional block diagram of a frequency locked loop circuit suitable for use in the clock recovery subsystem illustrated in FIG. 6.

The look-ahead 66 and the clock recirculator 76, like the data filter 64, are formed of a series of controllable delay elements. The delay elements are controlled by the frequency locked loop circuit 77. A suitable frequency locked loop circuit is shown in FIG. 7 and described below. Suitable delay elements are shown in FIG. 8, also described below.

The look-ahead 66 determines whether there is a new data edge to process. The look-ahead 66 gives the clock recovery subsystem 65 enough time to allow the multiplexer control 68 to set the multiplexer 74 so that a new clock is created for each new data edge. If no new data edge occurs during a clock period, the prior clock causes a new clock to be generated. The end result is a recovered clock that is synchronized to the incoming data stream. More specifically, in general, each new data edge is applied to the multiplexer control 68 and sets a latch. When the latch is set, the multiplexer 74 connects the data pulse generator 70 to the clock recirculator 76. When the latch is reset, the multiplexer 74 connects the feedback pulse generator 72 to the clock recirculator 76.

The look-ahead 66 delays new data edges a predetermined period, e.g., 15ns, before the data edges are applied to the data pulse generator 70. In one actual embodiment of the invention, the look-ahead 66 has 35 delay elements, each delay element having a 1.5 nanosecond delay. A tap is provided after each delay element to potentially recover the data after each delay element increment. Data is extracted at the tenth tap, i.e., after a delay of fifteen nanoseconds, and applied to one input of a two-input exclusive-OR gate, which forms the data pulse generator 70. Data is also extracted at the twelve tap and applied to the other input of the exclusive-OR gate. As a result, the output of the exclusive-OR gate, i.e., the output of the data pulse generator 70, is a 3.0 nanosecond pulse. The 3.0 nanosecond pulse is applied by the multiplexer 74 to the clock recirculator 76 if the latch of the multiplexer control 68 is set. A suitable period of time, e.g., 7.5 nanoseconds, after the 3.0 nanosecond pulse, enters the clock recirculator 76 falling edge occurs on the CLOCK OUT output of the clock recirculator 76. A further similar period of time, i.e., 7.5 nanoseconds, after the falling edge occurs, the rising edge occurs on the CLOCK OUT output of the clock recirculator 76. 25 ns after entering the clock recirculator 76, the 3.0 nanosecond pulse emerges from the clock recirculator 76 as the FEEDBACK output. The FEEDBACK output rising edge causes the feedback pulse generator 72 to create a new 3.0 nanosecond pulse and the cycle is repeated. In one actual embodiment of the invention, the total time elapsed between the creation of the 3.0 nanosecond pulse and the occurrence of the rising edge at the FEEDBACK output is actually 24 nanoseconds, an additional 1ns of time being consumed by delays occurring in the signal paths coupling the relevant elements together.

As will be understood from the foregoing discussion, as long as the multiplexer 74 connects the feedback pulse generator 72 to the clock recirculator 76, in essence, a clock pulse recirculates through the loop defined by the multiplexer 74, the clock recirculator 76, and the feedback pulse generator 72. In one actual embodiment of the invention, the clock pulse travels around the loop in 25 nanoseconds. A new data edge applied to the input of the look-ahead 66 is delayed for a predetermined period, e.g., 35 nanoseconds in the look-ahead 66 before being applied to the reset input of the latch of the multiplexer control 68. By the time this occurs, the new data edge will have caused the data pulse generator 70 to create a pulse and the clock recirculator 76 to generate a falling edge and a rising edge based on the pulse.

The delay between the setting of the latch of the multiplexer control 68 by a new data edge and the resetting of the latch by the look-ahead 66 could result in several data edges being present in the look-ahead at the same time. In order to handle this situation, preferably, the multiplexer control 68 has several latches that are serially set, i.e., the first new data edge sets the first latch, the second new data edge sets the second latch, etc. As long as any of the latches are set, the multiplexer 74 is set to connect the output of the data pulse generator 70 to the input of the clock recirculator 76.

Figure 7A:
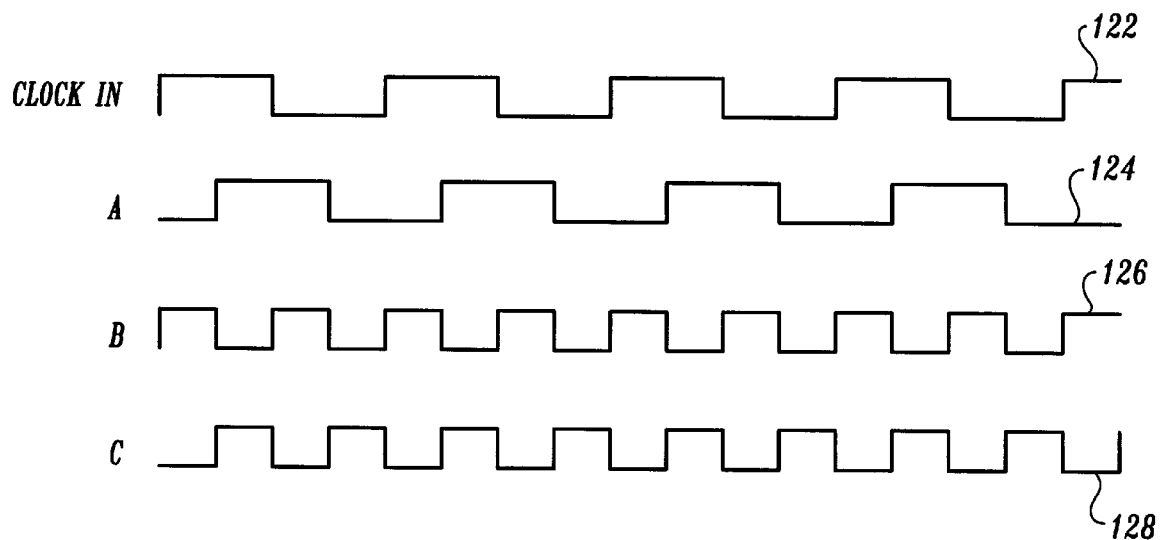
FIG. 7A is a firming diagram for FIG. 7.

FIG. 7 illustrates a frequency locked loop circuit suitable for controlling the delay elements used to form the data filter 64 and the look-ahead 66 and clock recirculator 76 of the clock recovery subsystem 65 illustrated in FIG. 6. The frequency locked loop circuit also controls the delay elements of other circuits that form part of the hereinafter described logic control system shown in FIG. 6. FIG. 7A is a timing diagram for the frequency locked loop circuit shown in FIG. 7. The delay elements are illustrated in FIG. 8 and described below.

The frequency locked loop circuit includes an exclusive-OR gate 108, a first 90 degree delay 110, a second 90 degree delay 112, a gain 113, a summer 114 and a transconductance amplifier 116. An externally generated control clock is applied to one input of the exclusive-OR gate 108. Line 122 of the timing diagram represents the control clock applied to the frequency locked loop circuit. In one actual embodiment of the invention, the control clock had a frequency of 10 MHz, i.e., a period of 100 nanoseconds. The control clock was derived from a 40 MHz clock by dividing down the 40 MHz clock. The control clock is also applied to the first 90 degree delay 110. The first 90 degree delay 110 includes a plurality of series-connected delay elements of the type shown in FIG. 8 sufficient to delay the control clock by 90 degrees, i.e., 25 nanoseconds. The output of the first 90 degree delay 110 is applied to the second input of the exclusive-OR gate 108.

Line 124 of the timing diagram shows the control clock delayed by 90 degrees. Line 124 is a square wave having a high value of VCC. As will be appreciated by those skilled in this art and others, the exclusive-OR gate 108 logically combines the control clock and the output of the first 90 degree delay 110. The output of the exclusive-OR gate 108 is represented by line 126 of the timing diagram. In essence, the output is a square wave having a frequency double that of the control clock that is in phase with the control clock.

The output of the exclusive-OR gate 108 is applied to one input of the summer 114. The output of the exclusive-OR gate 108 is also applied to the second 90 degree delay 112. The second 90 degree delay 112 delays the output of the exclusive-OR gate 108 by the same amount as the first 90 degree delay, i.e., 25 nanoseconds. The output of the second 90 degree delay 112, shown on line 128 of the timing diagram, is applied to the second input of the summer 114. The summer 114 combines the outputs of the exclusive-OR gate and the second 90 degree delay. The output of the summer 114 is divided by a factor of two by the gain 113. The divided signal is applied to the positive input of the transconductance amplifier 116. A DC voltage equal to half of VCC is applied to the negative input of the transconductance amplifier 116. The outputs of the transconductance amplifier 116 are two control currents of equal magnitude, but opposite polarity, Ip and In, that are fed back to the first and second 90 degree delays 110 and 112. In essence, the transconductance amplifier 116 has a differential output. The differential output is used to adjust the delay elements of the first and second 90 degree delays 110 and 112 in the manner illustrated in FIG. 8 such that each has a delay of 90 degrees.

The feedback is used to keep the delay provided by the first and second 90 degree delays 110 and 112 constant and independent of fabrication process, power supplies, and temperature. When the first and second 90 degree delays 110 and 112 each produce the desired delay, the average voltage of the signals applied to the inputs of the summer 114 will be VCC/2. As will be readily appreciated by those skilled in this art and others, the second 90 degree delay 112 eliminates the need to filter the output of the exclusive-OR gate 108. As noted above, the signals applied to the input of the summer 114 are separated in phase by 180 degrees. As a result, the output of the summer 114 is a DC signal.

Currents Ip and In have magnitudes that, as will be better understood from the following description of FIG. 8 cause each delay element of a series of elements to have a predetermined delay, e.g., 1.5 nanoseconds. The output currents Ip and In are applied to delay elements in data filter 64, the look-ahead 66, and the clock recirculator 76, as well as to delays in the control logic subsystem 67 described below.

As stated above, many subsystems include a delay system formed of a series of delay elements. FIG. 8 illustrates a delay system 129 formed of a series of elements 130 suitable for use in the heretofore and hereinafter described elements, i.e., the data filter 64, the look-ahead 66, the clock recirculator 76, etc. While the preferred form of delay element in shown in FIG. 8 and described below, it is to be understood that other delay elements can be used in actual embodiments of the invention, if desired.

The delay system 129 illustrated in FIG. 8 includes two MOSFETs designated QB1 and QB2, and a series of delay elements 130, 132 . . . QB1 is an N-channel MOSFET and QB2 is a P-channel MOSFET. Each delay element 130 includes four double-gated MOSFETs designated Q1c, Q2c, Q3c, Q4c. Q1c and Q3c are N-channel MOSFETs and Q2c and Q4c are P-channel MOSFETs. As noted above, the control currents Ip and In are applied to the delay system 129. More specifically, control current Ip is applied to the drain and gate of QB1. Control current In is applied to the drain and gate of QB2. The source of QB1 is connected to the supply voltage VCC.

The gate of QB1 is connected to the source gates of Q1c and source gate of Q3c of delay element 130 and all following delay elements 132 . . . The incoming signal to be delayed designated Din is applied to the drain gates of Q1c and Q2c. The drains of Q1c and Q2c are connected to one another and connected to the drain gates of Q3c and Q4c. The drain of Q3c is connected to the drain of Q4c.

The gate of QB2 is connected to the source gate of Q2c and to the source gate of Q4c of delay element 130 and all following delay elements 132 . . . The sources of QB2, Q2c, and Q4c are connected to ground. The output of the delay element, which forms the input of the next delay element is the junction between the drains of Q3c and Q4c.

The delay system 129 operates as follows: QB1 and QB2 set bias voltages on the source gates of Q1c and Q2c respectively. The control currents Ip and In control the bias voltage and, thus, the charging of the drain gates of Q1c and Q2c. The drain gates of Q1c and Q2c function as an inverter. The inverse of Din appears at the connection between the drains of Q1c and Q2c. The inverse is applied to the drain gates of Q3c and Q4c. The operation of Q3c and Q4c mirrors the operation of Q1c and Q2c. The inverse of the signal appearing at the drains of Q1c and Q2c, as described above, appears at the connection between the drains of Q3c and Q4c. The output of the delay element designated Dout, emerges from the delay element 130 after a predetermined delay whose magnitude is controlled by the magnitude of the control currents Ip and In. Dout becomes Din for the next stage, which is not shown in FIG. 8. The Dout of each stage may be extracted by an output tap, indicated by the lead connecting the drains of Q3c and Q4c through an inverter 133. Similarly, another output tap is formed by the lead connecting the drains of Q1c and Q2c through an inverter 131. As will be readily appreciated, output taps can be provided in a like manner at various positions in the delay system 129 to allow the extraction of Dout at a predetermined time delay.

Subsequent delay elements 132, 134, . . . are identical to the just described delay element 130. Double-gated MOSFETs are chosen to avoid the generation of parasitics associated with conventional delay techniques employing single gated MOSFETs. Furthermore, double-gated MOSFETs employ only half the area of single gated MOSFETs on a semiconductor die resulting in a smaller overall transceiver 14.

Returning to FIG. 6, the control logic subsystem 67 comprises: a timer 142; a buffer 144; a data validation check shift register 146; decode logic 148; an end-of-message (EOM) latch 150; first and second delays 152 and 154; and an inverter 156. The output of the data filter 64 64 is applied to the input of the timer and the output of the timer, denoted 1 MBit EOM, is applied to one input of the EOM latch 150. The output of the look-ahead 66 of the clock recovery subsystem 65, denoted DATA OUT, is applied to the signal input of the buffer 144 and to the signal input of the shift register 146. The CLOCK OUT output of the clock recirculator 76 is applied to a clock input of the buffer 144 and to the clock input of the data validation check shift register 146. The buffer also receives the externally produced receive enable control signal and the 20 MBit enable signal.

The outputs of the stages of the data validation check shift register 146 are connected to the decode logic 148. The decode logic produces an enable output when either of two different signals, e.g., 1 MBit or 20 MBit, are received. The enable output of the decode logic is applied to the buffer 144 and to a second input of the EOM latch 150. The decode logic also produces two additional outputs, designated 1 MBit detect and 20 MBit EOM. These outputs are applied to third and fourth inputs of the EOM latch 150. The output of the EOM latch is applied to the input of the first delay 152. In one actual embodiment of the invention, the first delay is a 30 ns delay. The output of the first delay is the EOMN control signal previously described in connection with the AC coupler (FIG. 5). The output of the first delay 152 is applied to the input of the second delay 154. In one actual embodiment of the invention, the second delay is a 50 ns delay. The output of the second delay 154 is applied to the input of the inverter 156. The output of the inverter is the EOM control signal previously described in connection with the AC coupler. The threshold signal produced by the threshold detector 106 of the post amplifier/quantizer (FIG. 5) in the manner previously described, is applied to the a further input of the EOM latch 150.

In operation, the buffer passes the DATA OUT and CLOCK OUT signals it receives from the clock recovery subsystem 65 when the buffer is enabled. The buffer is enabled when the receive enable control signal is logically true and when the decode logic detects that the DATA OUT signal is one of the two signals—a 1 MBit or a 20 MBit signal in the embodiment of the invention being described. The 20 MBit enable signal is applied to the buffer 144 to prepare the reception of 1 MBit data or 20 MBit data, depending on the state of the 20 MBit enable signal. The decode logic determines whether the incoming signal is one or the other of the signals by analyzing the input pattern of the incoming signal. This is accomplished by analyzing the output stages of the data check shift register 146. One of the signals is required to have one input pattern, such as 111111 (1 MBit data) and the other is required to have another input pattern, such as 101010 (20 MBit data), before the output of the decode logic shifts to a true state. Obviously, if desired, other input codes can be used.

As noted above, the decode logic produces two additional outputs. If an input pattern identifying one of the desired signals, namely the 1 MBit signal, is detected, the 1 MBit detect output of the decode logic achieves a binary true state. At the end of a 20 MBit signal (000000), the 20 MBit EOM output shifts to a true state.

The EOM latch 150 is set when any one of the enable output of the decode logic, the 1 MBit detect output of the decode logic or the output of the threshold detector shifts to a true state. The EOM latch 150 is reset if either the 1 MBit EOM or 20 MBit EOM outputs of the timer 142 or the decode logic respectively shift to a logical true state. In this regard, the timer is started upon the receipt of the first data transition. The timer is used for each subsequent data transmission. If no transitions occur for a predetermined period of time, the timer times out, causing the 1 MBit EOM output to shift from a false state to a true state.

When the EOM latch 150 is set, the EOMN output, after a short delay created by the first delay 152, shifts to a logical true state, meaning that a message is being received. As noted above, this causes SWC1 and SWC2 to open and disconnect CC3 of the AC coupler circuit. After a further delay, EOM shifts to a logical false state, causing the SWD to close and short CC3. When the EOM latch 150 is reset, the reverse occurs. First, the EOMN output shifts to a logical false state, which causes SWC1 and SWC2 to close and connect CC3 across the output of the AC coupler. Then, EOM shifts to a logical true state, which opens SWD, stopping the shorting of CC3.

While the preferred embodiment of the invention has been illustrated and described, it will be appreciated that various changes can be made therein without departing from the spirit and scope of the invention as defined in the appended claims.

The embodiments of the invention in which an exclusive property or privilege is claimed are defined as follows:

1. A transceiver for transmitting digitally coded data signals on and receiving digitally coded data signals from an optical transmission medium, comprising:
   a) a transmitter for receiving digitally coded data to be transmitted and converting said digitally coded data signals into a form suitable for transmission on an optical transmission medium; and
   b) a receiver for receiving digitally coded data signals from an optical transmission medium, converting said digitally coded data signals into a form suitable for detection and recovering a clock from said received digitally coded data signals, said receiver comprising:
      1) a photodiode for receiving digitally coded data signals from an optical transmission medium;
      2) a preamplifier coupled to said photodiode for receiving digitally coded data signals from said photodiode and differentially amplifying said signals;
      3) an AC coupler coupled to said preamplifier for receiving said differentially amplified digitally coded data signals and removing the DC component of said differentially amplified digitally coded data signals, said AC coupler including a switching circuit for causing the AC component of said differentially amplified digitally coded data signals to have a purely differential signal form;
      4) a post amplifier/quantizer coupled to said AC coupler for receiving said AC component of said differentially amplified digitally coded data signals from said AC coupler and producing a related quantized digitally coded data signal; and
      5) a data filter, clock recovery and control logic system coupled to said post amplifier/quantizer for:
         i) receiving said quantized digitally coded data signal;
         ii) filtering said quantized digitally coded data signal to pass valid digitally coded data and reject undesired noise and upsets;
         iii) recovering a clock signal from said quantized digitally coded data signal that is synchronized by every data edge of the quantized signal; and
         iv) controlling the switching circuit of said AC coupler.

2. The transceiver claimed in claim 1, wherein said preamplifier creates a voltage level shift that reverse biases said photodiode.

3. The transceiver claimed in claim 2, wherein said preamplifier also offsets the digitally coded data signals received from said photodiode to extend the dynamic range of said transceiver.

4. The transceiver claimed in claim 3, wherein said preamplifier uses current feedback to extend the bandwidth of the transceiver to higher frequencies to make the transceiver more immune to single event upsets.

5. The transceiver claimed in claim 1, wherein said AC coupler includes a capacitor connectable across the output of said AC coupler by said switching circuit.

6. The transceiver claimed in claim 1, wherein said post amplifier/quantizer includes a threshold detector for producing a threshold signal indicating whether the output of said AC coupler is a valid data signal.

7. The transceiver claimed in claim 1, wherein said data filter, clock recovery and control logic system includes control logic that receives said threshold signal and based thereon selectively causes said switching circuit to switch at a predetermined period of time after a valid data signal is received.

8. The transceiver claimed in claim 1, wherein said data filter, clock recovery and control logic system includes a data filter that samples said quantized digitally coded data signal at predetermined intervals and uses said samples to determine the stability and validity of said quantized digitally coded data signal.

9. The transceiver claimed in claim 1, wherein said data filter includes a delay line comprising a plurality of serially connected delay elements and wherein said samples are taken from taps located between said plurality of serially connected delay elements.

10. The transceiver claimed in claim 8, wherein said data filter, clock recovery and control logic system includes a clock recovery, said clock recovery comprising:
    a look ahead connected to said data filter for receiving signals from said data filter;
    a multiplexer control connected to said data filter and to said look ahead for receiving signals from said data filter and said look ahead, said multiplexer control including a latch that is set when the signal received from said data filter undergoes a data transition in a predetermined direction and reset when the signal received from said look ahead undergoes a transition in a predetermined direction;
    a data pulse generator connected to said look ahead for receiving a signal from said look ahead and producing a pulse when said signal undergoes a predetermined data transition;
    a feedback pulse generator for producing an output pulse upon receipt of a feedback pulse;
    a multiplexer connected to said multiplexer control, said data pulse generator and said feedback pulse generator for selectively supplying pulses produced by said data pulse generator to an output based on the state of the latch of said multiplexer control; and
    a clock recirculator connected to the output of said multiplexer for receiving pulses from said multiplexer and based thereon producing a recovered clock and said feedback pulse, and applying said feedback pulse to said feedback pulse generator.

11. The transceiver claimed in claim 10, wherein said data filter includes a delay line comprising a plurality of serially connected delay elements and wherein said samples are taken from taps located between said plurality of serially connected delay elements.

12. The transceiver claimed in claim 11, wherein said look ahead and said clock recovery also each include a delay line comprising a plurality of serially connected delay elements.

13. The transceiver claimed in claim 12, wherein said clock recovery also includes a frequency locked loop connected to the delay elements of said data filter, said look ahead and said clock recirculator for controlling the delay created by said delay elements.

14. The transceiver claimed in claim 13, wherein said delay elements include double-gated field effect transistors.

15. A receiver for receiving digitally coded data signals from an optical transmission medium, converting said digitally coded data signals into a form suitable for detection and recovering a clock from said received digitally coded data signals comprising:
    a) a photodiode for receiving digitally coded data signals from an optical transmission medium;
    b) a preamplifier coupled to said photodiode for receiving digitally coded data signals from said photodiode and differentially amplifying said signals;
    c) an AC coupler coupled to said preamplifier for receiving said differentially amplified digitally coded data signals and removing the DC component of said differentially amplified digitally coded data signals, said AC coupler including a switching circuit for causing the AC component of said differentially amplified digitally coded data signals to have a purely differential signal form;
    d) a post amplifier/quantizer coupled to said AC coupler for receiving the AC component of said differentially amplified digitally coded data signals from said AC coupler and producing a related quantized signal; and
    e) a data filter, clock recovery and control logic system coupled to said post amplifier/quantizer for:
        1) receiving said quantized digitally coded data signal;
        2) filtering said quantized digitally coded data signal to pass valid digitally coded data and reject undesired noise and upsets;
        3) recovering a clock signal from said quantized digitally coded data signal that is synchronized by every data edge of the quantized digitally coded data signal; and
        4) controlling the switching circuit of said AC coupler.

16. The receiver claimed in claim 15, wherein said preamplifier creates a voltage level shift that reverse biases said photodiode.

17. The receiver claimed in claim 16, wherein said preamplifier also offsets the digitally coded data signals received from said photodiode to extend the dynamic range of said receiver.

18. The receiver claimed in claim 17, wherein said preamplifier uses current feedback to extend the bandwidth of the receiver to higher frequencies to make the receiver more immune to single event upsets.

19. The receiver claimed in claim 15, wherein said AC coupler includes a capacitor connectable across the output of said AC coupler by said switching circuit.

20. The receiver claimed in claim 15, wherein said post amplifier/quantizer includes a threshold detector for producing a threshold signal indicating whether the output of said AC coupler is a valid data signal.

21. The receiver claimed in claim 15, wherein said data filter, clock recovery and control logic system includes control logic that receives said threshold signal and based thereon selectively causes said switching circuit to switch at a predetermined period of time after a valid data signal is received.

22. The receiver claimed in claim 15, wherein said data filter, clock recovery and control logic system includes a data filter that samples said quantized digitally coded data signal at predetermined intervals and uses said samples to determine the stability and validity of said quantized digitally coded data signal.

23. The receiver claimed in claim 15, wherein said data filter, clock recovery and control logic system includes a data filter that samples said quantized signal at predetermined intervals and uses said samples to determine the stability and validity of said quantized signal.

24. The receiver claimed in claim 23, wherein said data filter includes a delay line comprising a plurality of serially connected delay elements and wherein said samples are taken from taps located between said plurality of serially connected delay elements.

25. The receiver claimed in claim 23, wherein said data filter, clock recovery and control logic system includes a clock recovery, said clock recovery comprising:

a look ahead connected to said data filter for receiving signals from said data filter;

a multiplexer control connected to said data filter and to said look ahead for receiving signals from said data filter and said look ahead, said multiplexer control including a latch that is set when the signal received from said data filter undergoes a data transition in a predetermined direction and reset when the signal received from said look ahead undergoes a transition in a predetermined direction;

a feedback pulse generator for producing a pulse upon receipt of a pulse feedback signal;

a multiplexer connected to said multiplexer control, said data pulse generator and said feedback pulse generator for selectively supplying pulses produced by said data pulse generator based on the state of the latch of said multiplexer control; and a clock recirculator connected to the output of said multiplexer for receiving pulse from said multiplexer and based thereon producing a recovered clock and said pulse feedback signal, said pulse feedback signal being applied to said feedback pulse generator.

26. The receiver claimed in claim 25, wherein said look ahead and said clock recovery also each include a delay line comprising a plurality of serially connected delay elements.

27. The receiver claimed in claim 26, wherein said clock recovery also includes a frequency locked loop connected to the delay elements of said data filter, said look ahead and said clock recirculator for controlling the delay created by said delay elements.

28. The receiver claimed in claim 27, wherein said delay elements include double-gated field effect transistors.

* * * * *

UNITED STATES PATENT AND TRADEMARK OFFICE
CERTIFICATE OF CORRECTION

PATENT NO. : 5,828,476
DATED : October 27, 1998
INVENTOR(S) : R.K. Bonebright et al.

It is certified that error appears in the above-identified patent and that said Letters Patent is hereby corrected as shown below:

<u>Title page,</u>
Item [56], References Cited, U.S. PATENT DOCUMENTS, please insert the following references:

|   |   |   |
|---|---|---|
| -- 4,015,083 | 3/29/1977 | Bellisio, J.A. |
| 4,494,021 | 1/15/1985 | Bell, A.G. et al. |
| 4,504,749 | 3/12/1995 | Yoshida, K. |
| 4,644,297 | 2/17/1987 | Olds, K.A. |
| 4,806,804 | 2/21/1989 | O'Leary, P. |
| 4,833,695 | 5/23/1989 | Greub, H.J. |
| 5,012,142 | 4/30/1991 | Sonntag, J.L. |
| 5,121,014 | 6/9/1992 | Huang, E.C. |
| 5,192,886 | 3/9/1993 | Wetlaufer, G.D. |
| 5,301,196 | 4/5/1994 | Ewen, J.F. et al. |
| 5,399,995 | 3/21/1995 | Kardontchik, J.E. et al. |
| 5,420,531 | 5/30/1995 | Wetlaufer, G.D. |
| 5,446,416 | 8/29/1995 | Lin, J. et al. |
| 5,452,324 | 9/19/1995 | Lewis et al. -- |

Signed and Sealed this

Third Day of September, 2002

*Attest:*

JAMES E. ROGAN
*Attesting Officer* — *Director of the United States Patent and Trademark Office*